May 13, 1924.
W. E. MILLER
SPROCKET WHEEL
Filed Jan. 18, 1919
1,493,863
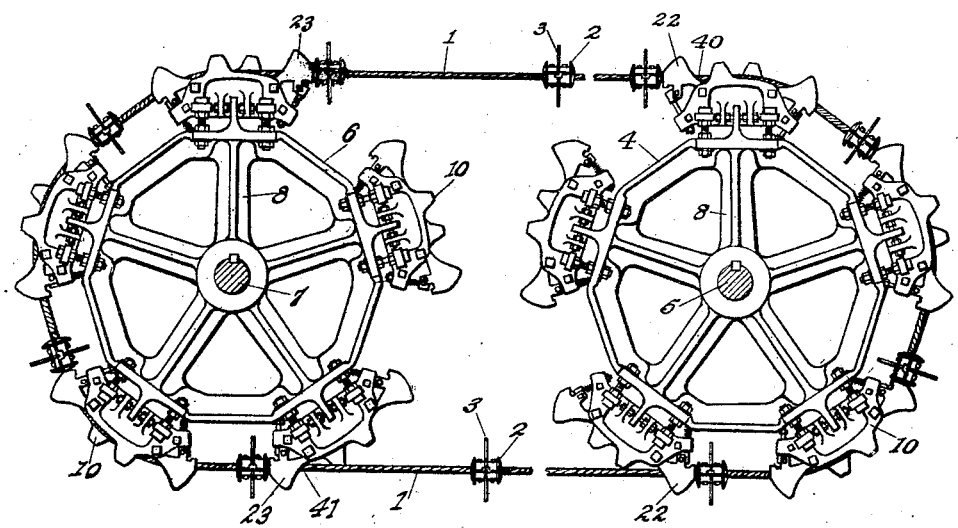
Fig.1.
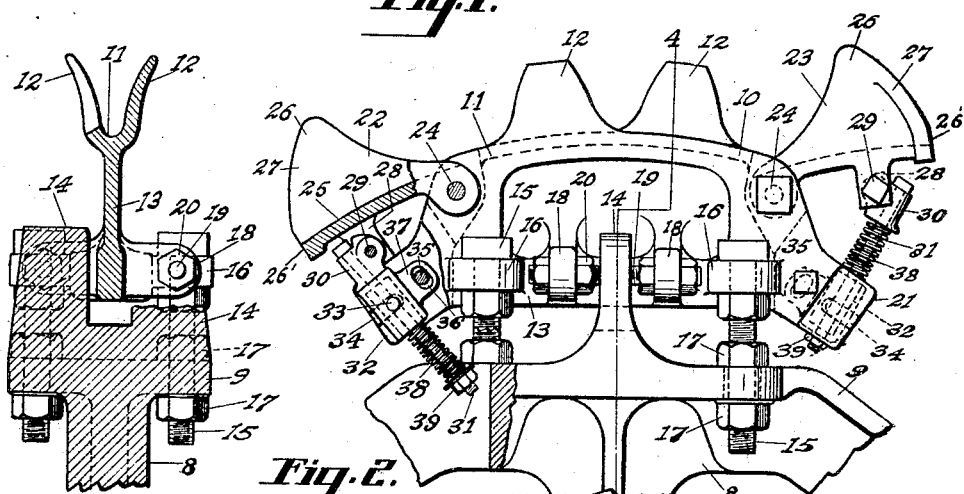
Fig.2.
Fig.4.
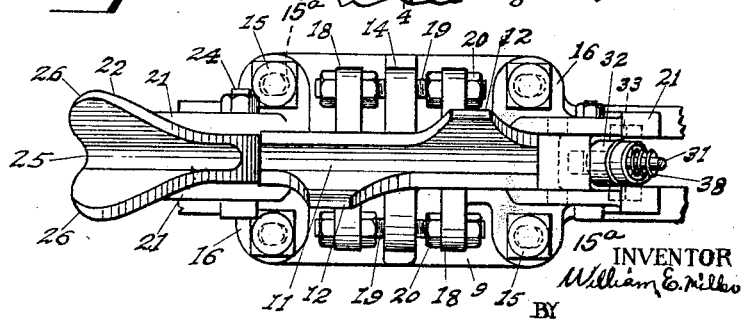
Fig.3.
WITNESSES:
Harry C. Dean.
Dudley T. Fisher
INVENTOR
William E. Miller
BY
ATTORNEY.

Patented May 13, 1924.

1,493,863

UNITED STATES PATENT OFFICE.

WILLIAM E. MILLER, OF COLUMBUS, OHIO, ASSIGNOR TO THE JEFFREY MANUFACTURING COMPANY, OF COLUMBUS, OHIO, A CORPORATION OF OHIO.

SPROCKET WHEEL.

Application filed January 18, 1919. Serial No. 271,916.

*To all whom it may concern:*

Be it known that I, WILLIAM E. MILLER, a citizen of the United States, residing at Columbus, in the county of Franklin and State of Ohio, have invented certain new and useful Improvements in Sprocket Wheels, of which the following is a specification, reference being had therein to the accompanying drawing.

The present invention relates to certain new and useful improvements in sprocket wheels, and particularly to sprocket wheels of the class adapted for use in power transmission or material conveying apparatus comprising an endless flexible cable to which a plurality of equally spaced transmission blocks, or material engaging scrapers, are securely clamped.

One object of this invention is to provide a sprocket wheel of the class described having improved cable engaging elements adapted to adjustment to compensate for the elongation of the cable due to the strains of service.

A further object is to provide a wheel of the class described having improved cable engaging elements adapted to contact with and to release the transmission blocks of the cable without shock or vibration.

The devices by which I attain these objects are fully set forth in the following specification and illustrated in the accompanying drawings of which—

Fig. 1 is an illustration of a cable conveyer comprising an endless cable arranged in cooperative relation with a pair of sprocket wheels embodying my present invention.

Fig. 2 is a fragmentary side elevation on an enlarged scale showing a cable engaging element of the wheels illustrated in Fig. 1.

Fig. 3 is a plan view of the device illustrated in Fig. 2, one of the sprocket engaging teeth being removed to reveal other parts.

Fig. 4 is a transverse sectional view taken along the line 4—4 of Fig. 2.

Like numerals refer to similar parts in the several figures.

In Fig. 1 I have illustrated a conveying mechanism of the well known type comprising an endless cable 1 to which are securely clamped at equally spaced intervals transmission blocks 2 encircled by transverse flanges 3 which constitute scrapers adapted to travel longitudinally of a suitably formed conveyer trough to propel material therethrough. As the conveyer trough forms no part in the present invention its illustration and description is not thought to be required at this time. At the driving end of the conveyer the cable 1 passes around the driving sprocket wheel 4 which is keyed to the driving shaft 5 supported in any preferred manner and actuated from any convenient source of power. At the other end of the conveyer the cable 1 passes around a driven sprocket wheel 6 mounted upon a suitable supporting shaft 7 which is journaled in suitable bearings in a manner well understood in conveyer practice. The wheels 4 and 6 are similar in construction and a description of one will apply to both. On a wheel center 8 are laterally extending rim flanges 9 to which are attached a plurality of equally spaced cable engaging rim segments 10. Each rim segment consists of a casting upon which is formed a circumferentially extending cable seat 11 adapted to support the cable. At each side of the cable seat 11 are outwardly diverging wings 12 adapted to guide the cable onto the cable seat, and to prevent its accidental lateral displacement. In the rim segment 10 is formed a longitudinally extending web 13 which is engaged on either side by radially extending lugs 14 of the wheel center, to secure the rim segments against lateral displacement while leaving it free to both radial and circumferential movement. Supporting bolts 15 are rigidly secured to laterally extending lugs 16 of the rim segment 10 and these bolts extend through suitable apertures 15ª of the flanges 9 of the wheel center, said apertures being of such form and dimensions as to permit bodily movement of said segment circumferentially of the wheel when the nuts 20 are loosened. The bolts 15 are fitted with nuts 17 by the adjustment of which the rim segments may be moved radially relative to the wheel center, and may be securely locked in any preferred position of radial adjustment. Other laterally projecting lugs 18 formed upon the web 13 are provided with apertures through which extend adjustment bolts 19 arranged to engage the opposite sides of the lugs 14. The adjustment bolts 19 are fitted with nuts 20 by the manipulation of which the rim segments 10 may be moved circumferentially relative to the wheel center, and may be securely locked in any preferred position of circumferential adjustment.

By the devices just described the rim segments 10 are securely attached to the wheel center and may be conveniently moved either inwardly or outwardly to increase or decrease the pitch diameter of the sprocket wheel to compensate for the elongation of the cable due to the strains of service, and each individual rim segments may be moved circumferentially to correct its position relative to adjacent rim segments. The apertures in the flanges 9 through which the supporting bolts 15 extend are sufficiently large to permit the degree of circumferential adjustment required.

Formed at each end of the rim segment 10 are longitudinally extending arms 21 between which are positioned the sprocket teeth 22 and 23 which engage the transmission blocks 2 to insure the traveling of the cable with the sprocket wheels. The sprocket teeth 22 and 23 are supported by and adapted to limited rotation about the pivot bolts 24 which extend transversely through the arms 21. The teeth 22 and 23 have cable seats 25 which form extensions of the cable seat 11 when the teeth are in working position, and the parts are so formed that the cable draws across the gaps between rim sections in lines tangential to the curvature of the cable seat. Each tooth is provided with outwardly diverging wings 26 adapted to guide the cable to its place upon the seats 25 and to prevent its lateral displacement. The free end surfaces 26' of the cable teeth are straight and lie in planes perpendicular to the tangent of the cable seat to afford a fair bearing against the transmission block. The outer edges 27 of the wings 26 are curved and lie inside the involute described by the cable block as it engages the tooth, to afford clearance necessary for the free movement of the tooth before engagement and after disengagement with the transmission block. Formed on the inner side of the sprocket teeth 22 and 23 near their outer ends, are lugs 28 through which extend transverse pivot bolts 29. Upon the bolts 29 are mounted knuckle blocks 30 to which are secured inwardly extending plunger rods 31. The plunger rods 31 extend through and are adapted to longitudinal reciprocation in cylinders 32 positioned between the arms 21 of the rim segments. The cylinders 32 are supported upon trunnions 33 which bear in longitudinally extending slots 34 formed in the adjacent faces of said arms. The trunnions 33 may be inserted through the open ends of the slots 34 to position the cylinders, and said cylinders are retained in position by transverse bolts 35 extending through the arms 21 and through the apertures 36 in wings 37 formed upon the side of the cylinder. The apertures 36 are sufficiently elongated to permit a certain degree of rotation of the cylinder upon the trunnions, thereby affording the flexibility necessary to the proper functioning of the parts. The cylinders 32 are counterbored through the greater part of their length and constitute sockets in which the compression springs 38 are seated. The open end of the cylinder 32, at the advancing end of the rim segment, is turned inwardly to cause the compression spring 38 to abut against a nut 39 fitted upon the plunger rod 31 drawing the plunger inwardly to hold the sprocket tooth 22 at its innermost limit of rotation. At the receding end of the rim segment the open end of the cylinder 32 is turned outwardly and the compression spring 38 abuts against the knuckle block 30 to hold the sprocket tooth 23 at the outermost limit of its rotation, the nut 39 limiting the movement of the plunger rod in that direction.

As shown in Fig. 1, during the operation of the conveyer the transmission blocks 2 normally engage the advancing sprocket teeth 22 of the driving wheel and the receding sprocket teeth 23 of the driven wheel. As the springs 38 normally hold the advancing teeth 22 in their innermost position of rotation, they roll in behind the transmission blocks as the cable engages the wheel, and travel with them to the position 40 at which the cable leaves the sprocket wheel in a tangential direction. If the sprocket teeth 22 and 23 were formed rigid with the rim section the friction of the engaging surfaces would prevent the release of the transmission blocks until the transverse strain produced in the cable was sufficient to overcome the resistance of said friction, to suddenly release the transmission block and cause a very undesirable vibration in the cable which would tend to the destruction of the apparatus. By its rotation about its pivot bolt 24 the sprocket tooth follows the transmission block along the tangential lines of the cable until its rotation has produced a sufficient shortening of its pitch relation with the succeeding tooth to permit its release without shock.

Conversely, as the compression springs of the receding sprocket teeth 23 normally hold them in their outermost position they arrive at the tangential line of the cable at the instant of engagement with the transmission blocks and roll gently into working position without sliding friction upon the surface of said blocks. At the position 41 where the cable leaves the sprocket wheel the sprocket teeth remain in contact with the transmission blocks until their rotation has produced a sufficient shortening of their pitch relation with the succeeding blocks to permit their release without shock to the cable.

The straight perpendicular contact surfaces at the ends 26' of the sprocket teeth insure fair bearings between contacting surfaces and prevents the bending of the cable due to irregular seating of the transmission blocks upon the teeth, and the peculiar curvature of the cable seat causes the cable to approach and depart from the rim parts along lines tangential to the general curvature of the rim without sharp bending over the ends of the teeth. By these means the cable is protected from the destructive local movement of the strands of the cable upon each other due to sharp bending thereby materially increasing the life of the apparatus.

What I claim is—

1. In a sprocket wheel, the combination with a wheel center, of rim sections adapted to engage a flexible draught member, and means to move said rim sections outwardly or inwardly to vary the pitch diameter of the sprocket wheel or to move each rim section circumferentially to adjust the pitch relation with the adjacent rim sections.

2. In a sprocket wheel, the combination with a wheel center, of rim sections adapted to engage a flexible draught member, outwardly projecting extensions of said wheel center engaging said rim sections to prevent their lateral movement relative to the wheel center while permitting their movement both radially and circumferentially, and means to move said rim sections either inwardly, outwardly or circumferentially, and to lock them in any preferred position of adjustment.

3. In a sprocket wheel, the combination with a wheel center having spaced apart rim sections adapted to engage a flexible draught member, bolts projecting inwardly from said rim sections, nuts upon said bolts engaging said wheel centers and adapted to move said rim sections either inwardly or outwardly or to lock them in any preferred position of radial adjustment, bolts engaging said wheel center, and nuts upon said last mentioned bolts to engage said rim sections to move them circumferentially or to lock them in any preferred position of circumferential adjustment.

4. In a sprocket wheel, the combination with a wheel center having laterally extending flanges, spaced apart rim sections adapted to engage a flexible draught member, bolts projecting inwardly from said rim sections and extending through apertures in said flanges, nuts upon said bolts engaging both sides of said flanges adapted to move said rim section either inwardly or outwardly or to lock them in any preferred position of radial adjustment, bolts engaging said wheel center, and nuts upon said last mentioned bolts to engage said rim sections to move them circumferentially or to lock them in any preferred position of circumferential adjustment.

5. In a sprocket wheel, the combination with a wheel center having spaced apart rim sections adapted to engage a flexible cable, of tooth members pivotally attached at the ends of said rim sections and adapted to engage transmission blocks clamped in spaced relation upon said cable, inwardly extending plungers flexibly connected with said tooth members, and means acting on said plungers to move said tooth members in one direction and to resist their movement in the opposite direction.

6. In a sprocket wheel, the combination with a wheel center having spaced apart rim sections adapted to engage a flexible cable, of tooth members pivotally attached at the ends of said rim sections and adapted to engage transmission blocks clamped in spaced relation upon said cable, plungers flexibly connected with said tooth members, and resilient means acting on said plungers to move said tooth members in one direction and to resist their movement in the opposite direction.

7. In a sprocket wheel, the combination with a wheel center having spaced apart rim sections adapted to engage a flexible cable, of tooth members pivotally attached to the ends of said rim sections and adapted to engage transmissions blocks clamped in spaced relation upon said cable, inwardly extending plungers flexibly connected with said tooth members, and resilient means acting on said plungers to move said tooth members in one direction and to resist their movement in the opposite direction.

8. In a sprocket wheel, the combination with a wheel center having spaced apart rim sections adapted to engage a flexible cable, of tooth members pivotally attached at the ends of said rim sections and adapted to engage transmission blocks clamped in spaced relation upon said cable, plungers pivotally attached to said tooth members, and resilient means acting upon said plungers to move said tooth members in one direction and to resist their movement in the opposite direction.

9. In a sprocket wheel, the combination with a wheel center having spaced apart rim sections adapted to engage a flexible cable, of tooth members pivotally attached to the ends of said rim sections and adapted to engage transmission blocks clamped in spaced relation upon said cable, cylinders upon said rim sections, plungers reciprocable in said cylinders and connected with said tooth members, and means to move said plungers in one direction and to resist their movement in the opposite direction.

10. In a sprocket wheel, the combination with a wheel center having spaced apart rim sections adapted to engage a flexible cable, of tooth members pivotally attached at the ends of said rim sections and adapted to engage transmission blocks clamped in spaced relation upon said cable, cylinders pivotally attached to said rim sections, plungers reciprocable in said cylinders and connected to said tooth members, and elastic means acting in said cylinders to move said plungers in one direction and to resist their movement in the opposite direction.

11. In a sprocket wheel, the combination with a wheel center having spaced apart rim sections adapted to engage a flexible cable, of tooth members movably attached to said rim sections and adapted to engage transmission blocks clamped in spaced relation upon the said cable, cylinders upon said rim sections, members movable in said cylinders and operatively connected to said tooth members, and means to move said members in said cylinders to cause the movement of said tooth members.

12. In a sprocket wheel, the combination with a wheel center having spaced apart rim sections adapted to engage a flexible cable, of tooth members pivotally attached to said rim sections and adapted to engage transmission blocks clamped in spaced relation upon said cable, cylinders upon said rim sections, members movable in said cylinders and operatively connected with said tooth members, and elastic elements in said cylinders acting upon said members to move said tooth members.

13. In a sprocket wheel, the combination with a wheel center, of teeth movable upon said wheel center, cylinders upon said wheel center, members movable in said cylinders and operatively connected with said tooth members, and elastic elements acting on said movable members to move said teeth.

14. In a sprocket wheel, the combination with a wheel center having spaced apart rim sections adapted to engage a flexible cable, of tooth members movably attached to said rim sections and adapted to engage transmission blocks clamped in spaced relation upon said cable, movable members flexibly connected with said tooth members, and means acting on said movable members to move said tooth members.

15. In a power transmission device, the combination with a wheel of power transmitting teeth bodily movable in relation to the wheel from one operative position to another and adapted to engage spaced apart power transmission elements, members on the wheel operatively connected to said teeth and movable bodily therewith, and elastic means acting on said members to move said teeth relatively to said wheel in variable predetermined paths, said members being independently and freely movable.

16. In a power transmission device, the combination with a wheel, of power transmitting teeth bodily movable upon said wheel and adapted to engage spaced apart transmission elements, members on said wheel connected to the teeth and movable bodily therewith, said members being freely and independently movable pivotally, and elastic means acting on said members to move said teeth relatively to the wheel.

17. In a sprocket wheel, the combination with a wheel center of rim sections adapted to engage a flexible draft member, means to adjust said rim sections circumferentially, and means acting on substantially radial lines to adjust said sections radially.

18. In a sprocket wheel, the combination with a wheel center, of rim sections adapted to engage a flexible draft member, outwardly projecting extensions from said wheel center engaging said rim sections to prevent their lateral movement relatively to the wheel center while permitting their movement circumferentially and permitting their movement radially, means to move said rim sections circumferentially and to lock them in position after circumferential adjustment, and means acting on radial lines to move said sections radially and to lock them in operative position after radial adjustment.

19. In a sprocket wheel, the combination with a wheel center, of rim sections adapted to engage a flexible draft member, means adapted to adjust said rim sections circumferentially of the wheel, means adapted to adjust said sections radially of the wheel, and means for locking said rim sections in any selected position of adjustment.

20. In a sprocket wheel, the combination with a wheel center, of rim sections adapted to engage a flexible draft member, means on said wheel center adapted to prevent lateral movement of said rim sections relatively to the wheel center while permitting their movement circumferentially of the wheel, and means to adjust said rim sections circumferentially of the wheel and to lock them in any position of circumferential adjustment, thereby to vary the proportionate spacing of one tooth from another.

21. In a sprocket wheel, the combination with a wheel center, of rim sections adapted to engage a flexible draft member, and means to adjust said rim sections circumferentially of the wheel and to lock said sections in any selected position of adjustment, thereby to vary the proportionate spacing of one tooth from another.

In testimony whereof, I affix my signature, in presence of two witnesses.

WILLIAM E. MILLER.

Witnesses:
ANNA M. FENLON,
HARRY C. DEAN.